(12) United States Patent
Maniar et al.

(10) Patent No.: US 9,110,280 B2
(45) Date of Patent: Aug. 18, 2015

(54) VIEWABLE SURFACE HAVING UNNOTICEABLE SMUDGES

(75) Inventors: Papu D. Maniar, Mesa, AZ (US); Yi Wei, Chandler, AZ (US); Kenneth A. Dean, Phoenix, AZ (US); John J. D'Urso, Chandler, AZ (US)

(73) Assignee: Google Technology Holdings LLC, Mountain View, CA (US)

( * ) Notice: Subject to any disclaimer, the term of this patent is extended or adjusted under 35 U.S.C. 154(b) by 660 days.

(21) Appl. No.: 13/355,626

(22) Filed: Jan. 23, 2012

(65) Prior Publication Data

US 2012/0113611 A1   May 10, 2012

Related U.S. Application Data

(63) Continuation of application No. 11/937,830, filed on Nov. 9, 2007, now abandoned.

(51) Int. Cl.
| | |
|---|---|
| *H05K 5/00* | (2006.01) |
| *H05K 7/00* | (2006.01) |
| *G02B 27/00* | (2006.01) |
| *G02F 1/1335* | (2006.01) |

(52) U.S. Cl.
CPC ...... *G02B 27/0006* (2013.01); *G02F 1/133504* (2013.01); *Y10T 428/24364* (2015.01); *Y10T 428/24802* (2015.01)

(58) Field of Classification Search
CPC .. C03C 17/007; B29C 43/021; B29C 43/3697
USPC ............ 361/679.01, 679.02, 679.08, 679.09, 361/679.26–679.29, 679.3, 679.55–679.59; 248/917–924
See application file for complete search history.

(56) References Cited

U.S. PATENT DOCUMENTS

| | | | |
|---|---|---|---|
| 6,248,435 | B1 | 6/2001 | Leck |
| 6,512,512 | B1 | 1/2003 | Blanchard |
| 2003/0035199 | A1* | 2/2003 | Liang et al. .................. 359/296 |
| 2006/0097515 | A1 | 5/2006 | Raksha et al. |
| 2006/0110537 | A1 | 5/2006 | Huang et al. |
| 2006/0132945 | A1* | 6/2006 | Sano ............................. 359/883 |
| 2006/0286370 | A1 | 12/2006 | Chiu |

FOREIGN PATENT DOCUMENTS

WO   WO 2011101933 A1 *   8/2011

* cited by examiner

*Primary Examiner* — Jerry Wu
(74) *Attorney, Agent, or Firm* — Leydig, Voit & Mayer, LTD.

(57) ABSTRACT

A device (110, 151, 200) with a viewable surface (201) including a plurality of transparent pedestals (210) having a reflective material (406) disposed on its sides (408) make smudges forming thereon unnoticeable by taking advantage of optical characteristics including contrast and the user's visual acuity. The pedestals (210) generally have a width (412) of less than 50 microns, a height (414) equal to twice the width (412), and a spacing (416) between adjacent pedestals (210) equal to the width (412). The device (110, 151, 200) may be an electronic device, and more particularly a portable electronic device such as a cell phone.

10 Claims, 2 Drawing Sheets

VIEWABLE SURFACE HAVING UNNOTICEABLE SMUDGES

CROSS-REFERENCE TO RELATED APPLICATIONS

The present application is a CONTINUATION of U.S. application Ser. No. 11/937,830, filed Nov. 9, 2007 now abandoned. The above-identified application is hereby incorporated herein by reference in its entirety.

FIELD

The present invention generally relates to electronic devices and more particularly to a method and apparatus making smudges, including oils and dust, unnoticeable when formed on a viewable surface such as a display.

BACKGROUND

In many electronic devices, such as mobile communication devices, displays present information to a user. For example, polymer-dispersed liquid crystal (PDLC) display technology can display video and text information. These optical displays, especially touch panel displays, typically comprise a transparent or a high gloss reflective surface thermoplastic or glass layer. While these transparent layers have excellent transparency and are physically strong, they suffer both aesthetic and functional degradation due to the build up of oils and other contaminants during use. This is particularly true for the display components of products which receive significant handling, such as persona data assistants (PDAs) and cell phones. For these displays, any type of fouling is especially undesirable as it tends to be very noticeable to the user when the display is not in use and can result in a less than satisfactory electronic device appearance.

While screen protectors are available for many of these products, they do not offer an optimal solution. Most are based on anti-fouling coatings that temporarily reduce smudges, but also become scratched or otherwise degraded, necessitating that the consumer periodically replace them. Some known anti-fouling coatings comprising polymers typically become less transparent due to fabrication methods. Additionally, the fabrication processes for known anti-fouling coatings are unnecessarily complex and expensive. For example, see "Fabrication of Super Water-Repellent Surfaces by Nanosphere Lithography", Jau-Ye Shiu et al., Mat. Res. Soc. Symp. Proc., Vol. 823, pages W11.4.1-6, 2004.

Other known solutions require power and shorten the battery life of the electronic device.

Accordingly, it is desirable to provide an apparatus by which smudges on a viewable surface are unnoticeable, without any power drain. Furthermore, other desirable features and characteristics of the present invention will become apparent from the subsequent detailed description and the appended claims, taken in conjunction with the accompanying drawings and this background.

BRIEF DESCRIPTION OF THE DRAWINGS

Embodiments of the present invention will hereinafter be described in conjunction with the following drawing figures, wherein like numerals denote like elements.

DETAILED DESCRIPTION

Figure 1:
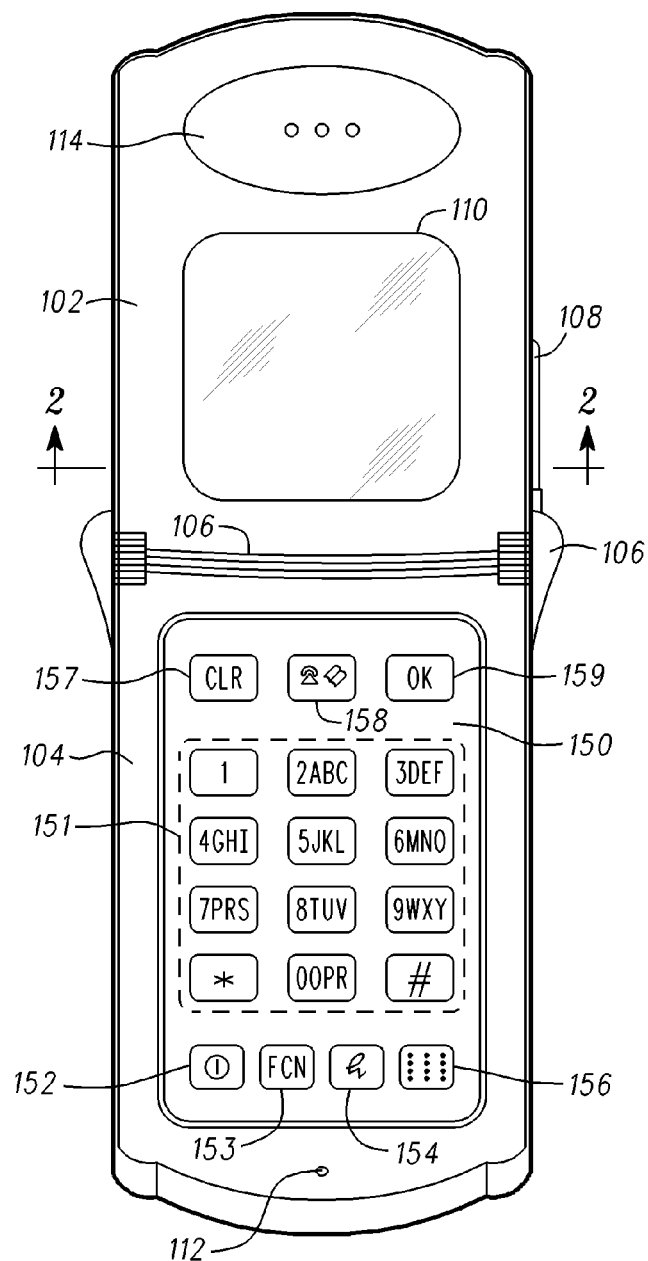
FIG. 1 is a front view of a mobile communication device having a display and/or touch screen in accordance with an exemplary embodiment.

The following detailed description is merely exemplary in nature and is not intended to limit the invention or the application and uses of the invention. Furthermore, there is no intention to be bound by any theory presented in the preceding background or the following detailed description.

A viewable surface of a device, and more particularly a viewable surface of an electronic device, and even more particularly a viewable surface of a transparent cover for a display in an electronic device, includes transparent pedestals projecting from the surface of the viewable surface, the pedestals having reflective sides that conceal, or suppress the appearance of, smudges on the viewable surface. A smudge is understood to mean distorted droplets of oil, fatty acids, and other contaminants forming, for example, a fingerprint when touched, resulting in a displeasing visual experience of the display when the display is off. Smudges not only provide a displeasing appearance, but increase the likelihood of the transparent cover being scratched through continual wiping by the user in an attempt to remove the smudges. Smudges are visible because they modify the reflected light from the surface of the transparent cover. Several visual characteristics, including contrast, visual acuity, and brightness, contribute to this concealing of smudges by the pedestals. The exemplary embodiment described herein minimizes the contrast between smudges and a clean area while minimizing any impact on normal viewing of the viewable surface.

It has been observed that when the display is on and light is provided from the display, or when the brightness of ambient light is high, smudges are generally not observable when the device is held at distance of 12 inches to 24 inches, but more typically around 15 to 19 inches distance. The human eye will not notice the smudge because any variation of reflected light is minimal compared to the brightness of the light emitted from the display. It is when the display is off and not emitting any light that the smudge is noticeable.

It has also been observed that smudges are much more noticible when the display is viewed at an angle, for example in the range of 50° to 150° to the surface, but more particularly in the range of 65° to 135°. It is noted that a person viewing the display when it is presenting information will typically be orientated perpendicular to the display, i.e., the eyesight is ninety degrees to the plane of the transparent cover. Therefore, when the display is on and being viewed, the smudges are generally not noticeable (due to both the perpendicular viewing angle and the brightness). It is generally only when the display is off, and the transparent cover is "seen" at an angle, that the smudges provide the unpleasing appearance.

It is this pedestal structure described hereinafter in more detail that reduces the likelihood of the smudges being seen at these angles when the display is off, while not substantially interfering with the information presented when the display is on.

Although the apparatus and method described herein may be used with an exposed display surface for any type of electronic device, the exemplary embodiment as shown in FIG. 1 comprises a mobile communication device 100 implementing a display or touch screen. While the electronic device shown is a mobile communication device 100, such as a flip-style cellular telephone, the display or touch screen can also be implemented in cellular telephones with other housing styles, personal digital assistants, television remote controls, video cassette players, household appliances, automobile dashboards, billboards, point-of-sale displays, landline telephones, and other electronic devices.

The mobile communication device 100 has a first housing 102 and a second housing 104 movably connected by a hinge 106. The first housing 102 and the second housing 104 pivot between an open position and a closed position. An antenna 108 transmits and receives radio frequency (RF) signals for communicating with a complementary communication device such as a cellular base station. A display 110 positioned on the first housing 102 can be used for functions such as displaying names, telephone numbers, transmitted and received information, user interface commands, scrolled menus, and other information. A microphone 112 receives sound for transmission, and an audio speaker 114 transmits audio signals to a user.

A keyless input device 150 is carried by the second housing 104. The keyless input device 150 is implemented as a touch-screen with a display. A main image 151 represents a standard, twelve-key telephone keypad. Along the bottom of the keyless input device 150, images 152, 153, 154, 156 represent an on/off button, a function button, a handwriting recognition mode button, and a telephone mode button. Along the top of the keyless input device 150, images 157, 158, 159 represent a "clear" button, a phonebook mode button, and an "OK" button. Additional or different images, buttons or icons representing modes, and command buttons can be implemented using the keyless input device. Each image 151, 152, 153, 154, 156, 157, 158, 159 is pixel driven, and this keyless input device uses a display with aligned optical shutter and backlight cells to selectively reveal one or more images and provide contrast for the revealed images in both low-light and bright-light conditions.

Those skilled in the art will appreciate that many types of displays may be utilized with the exemplary embodiments, including, for example, transmissive, reflective or transflective liquid crystal displays, cathode ray tubes, micromirror arrays, and printed panels. The transparent cover preferably is resistant to scratching and cracking due to extreme environmental conditions and use.

The exemplary embodiments described herein may be fabricated using known embossing or lithographic processes as follows. The fabrication of integrated circuits, microelectronic devices, micro electro mechanical devices, microfluidic devices, and photonic devices, involves the creation of several layers of materials that interact in some fashion. One or more of these layers may be patterned so various regions of the layer have different electrical or other characteristics, which may be interconnected within the layer or to other layers to create electrical components and circuits. These regions may be created by selectively introducing or removing various materials. The patterns that define such regions are often created by lithographic processes. For example, a layer of photoresist material is applied onto a layer overlying a wafer substrate. A photomask (containing clear and opaque areas) is used to selectively expose this photoresist material by a form of radiation, such as ultraviolet light, electrons, or x-rays. Either the photoresist material exposed to the radiation, or that not exposed to the radiation, is removed by the application of a developer. An etch may then be applied to the layer not protected by the remaining resist, and when the resist is removed, the layer overlying the substrate is patterned. Alternatively, the structure may be directly embossed to create the necessary pedestals or an additive process could also be used, e.g., building a structure using the photoresist as a template.

Though the above described lithography processes are preferred, other fabrication processes may comprise any form of lithography, for example, ink jet printing, photolithography, electron beam lithography, and imprint lithography ink jet printing. In the ink jet printing process, pigments or metal flakes may be combined in liquid form with the oil and printed in desired locations on the substrate.

Figure 2:
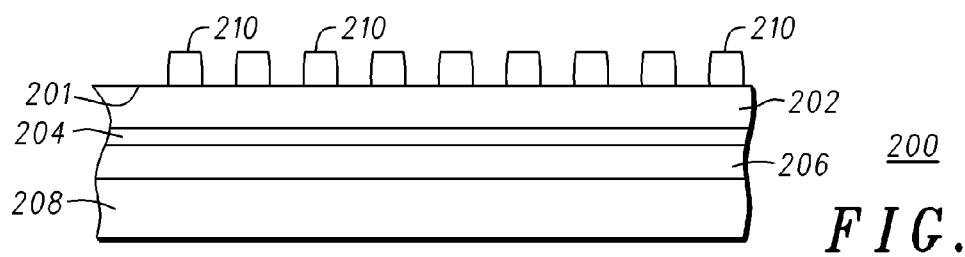
FIG. 2 is a partial cross-section of a display and/or touch screen in accordance with the exemplary embodiment taken along line 2-2 of FIG. 1.

Referring to FIG. 2, a cross section of a display or touch screen 200 in accordance with an exemplary embodiment is depicted that is usable for either the display 110 or the keyless input device 150 with the cross-section, for example, being a portion of a view taken along line 2-2 of FIG. 1. The display 200 is a stack with a user-viewable and user-accessible face 201 and multiple layers below the face 201, including a transparent cover 202, an optional touch sensitive layer stack 204, a transparent substrate 206, and an imaging device 208. The transparent cover 202 provides an upper layer viewable to and touchable by a user and may provide some glare reduction. The transparent cover 202 also provides scratch and abrasion protection to the layers 204, 206, 208 contained below. A plurality of pedestals 210 is disposed on the face 201 of the transparent cover 202. Alternatively, the pedestals and the substrate may be formed as one single layer with the region between pedestals 210 being filled with additional transparent material.

The substrate 206 protects the imaging device 208 and typically comprises plastic, e.g., polycarbonate or polyethylene terephthalate, or glass, but may comprise any type of material generally used in the industry. The optional touch sensitive layer stack 204 is formed over the substrate 206 and typically comprises a metal or an alloy such as indium tin oxide, a conductive polymer, resistive or capacitive elements or other touch sensing elements.

Figure 3:
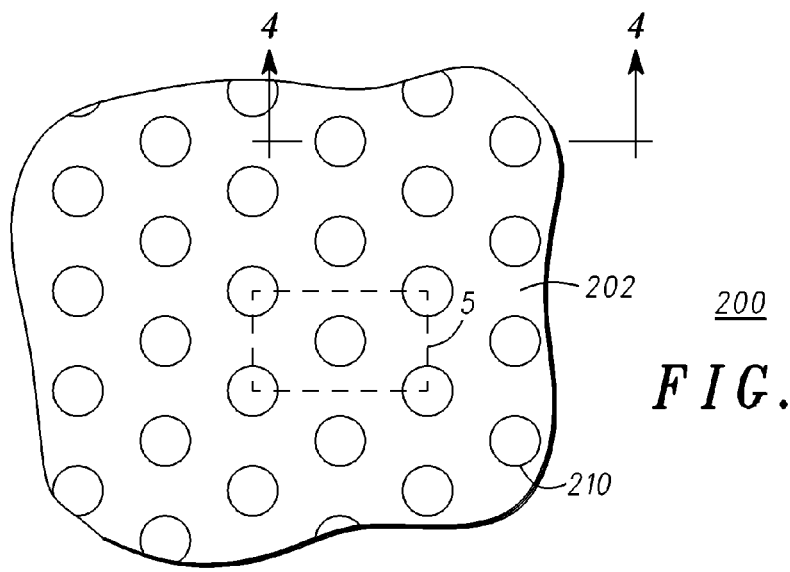
FIG. 3 is a top view of a portion of the display and/or touch screen in accordance with the exemplary embodiment of FIG. 1.
Figure 4:
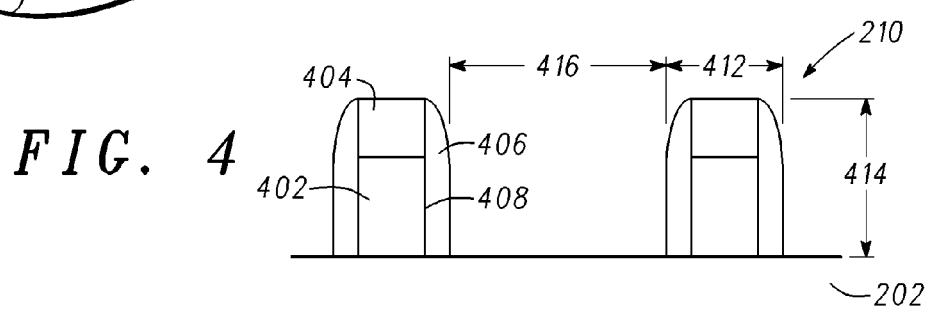
FIG. 4 is a cross section of the display and/or touch screen taken along lines 4-4 of FIG. 3.

Referring to FIG. 3, a top view of the face 201 includes the transparent cover 201 and the pedestals 210. A cross section of the pedestals 210 taken along the line 3-3 of FIG. 3 is shown in FIG. 4. While the pedestals may comprise any configuration, it is preferred that they are cylindrical in form. Each pedestal 210 includes a central core 402 of a transparent material such as glass or a polymer. A layer 404 of material is optionally formed on the central core 402. The layer 404 preferably is an antireflective coating and may comprise the same material as that of the transparent cover 202. A reflective material 406 if formed on the sides 408 of the central core 402 and the layer 404. Dimensions of the pedestals, discussed in more detail hereinafter, include a width "w" 412, height "h" 414, and spacing "s" 416 between the pedestals 210. The thickness of the reflective material 406 is preferably less than 5% of the width 412.

Figure 5:
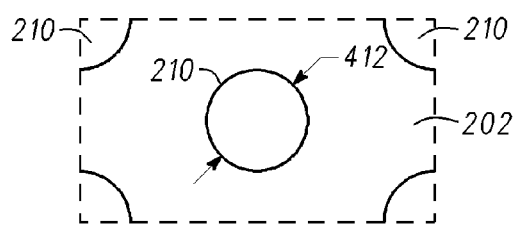
FIG. 5 is a top view of a portion of the display and/or touch screen taken within the line 5 of FIG. 3.

While the pedestals 210 may form various patterns, the pattern illustrated in FIG. 3 is preferred. Advantages of this pedestal structure may be understood by referring to FIG. 4, and FIG. 5 which is a depiction of the box 5 shown in FIG. 3. In FIG. 4, if the width "w" 412 of the pedestal 210 and spacing "s" 416 between adjacent pedestals 210 are kept below 100 microns, more preferably at or below 50 microns, the eye at normal cell phone viewing distances will not perceive separate pedestals, but rather perceive a continuous surface because of the eyes' visual acuity characteristics.

Reflectance (R) from the clean (no smudges) structure is the average reflectance from the relative area of high reflectance region made up of reflective material 406, and lower reflectance regions made up of top surface central core 402 with optionally coated surface of 404, and exposed surface of substrate 202. This can be represented as $R_{(clean,avg)} = f_{(low)} + (1-f)_{(high)} R_{(high)}$ where $f_{(low)}$ is the fraction of lower reflectance region 202, 402 (or 404 if present) and $(1-f)_{(high)}$ is the fraction of high reflectance region 406. Typical values for $R_{(low)}$ of carefully engineered surfaces for displays or touch screens will be approximately 0.01 and for $R_{(high)}$ will be close to 1.0 for eyes sensitivity to the visual spectrum which can be approximated at wavelengths of 550 nm. The value of f varies as the viewing angle is varied and greater contribution is observed from reflective material 406 at oblique viewing angles. The contribution from substrate surface 202 can be minimized with correctly chosen values for spacing "s" 416 for the display viewed at an angle, for example in the range of 50° to 150° to the surface, but more particularly in the range of 65° or 135°. The $R_{(avg)}$ across the clean surface of the display or touch screen will be essentially the same value in all areas of the display or touch screen.

When a smudge appears on the surface of a clean display surface or touch screen, two types of regions are created: the original clean areas and the smudge areas. The smudge is typically transparent (but with different optical characteristics) and will predominantly stick to horizontal surfaces such as top surface central core 402 (or the optional surface of layer 404), and exposed surface of substrate 202. These two regions will now acquire different values of reflectance: $R_{(clean,avg)}$ of original surface and $R_{(smudge,avg)}$ for the regions with smudge deposits. The $R_{(smudge,avg)}$ can be represented as $R_{(smudge,avg)} = f_{(smudge)} R_{(smudge)} + (1-f)_{(high)} R_{(high)}$ where $f_{(smudge)}$ is the fraction of smudge reflectance region and $(1-f)_{(high)}$ is the fraction of high reflectance region 406. Typical values for $R_{(smudge)}$ for displays or touch screens with deposits of smudge of varying thicknesses will be approximately 0.1, while $R_{(high)}$ will remain close to 1.0 for eyes sensitivity to the visual spectrum which can be approximated at wavelengths of 550 nm. The value of f will continue to vary as a function of the viewing angle and will be same for both the clean and smudge regions. If the contrast between the clean and smudge regions is below 10 to 30%, then the eye will not typically differentiate between these two regions and the presence of the smudge regions will be masked to eye. Contrast (C) for these two regions can be represented as $C = (R_{(clean,avg)} - R_{(smudge,avg)}) / (R_{(clean,avg)} + R_{(smudge,avg)})$. It can be seen that contrast can be manipulated by varying $f_{(high)}$ by designing in the well chosen values for width "w" 412, height "h" 414, and spacing "s" 416 between the pedestals 210.

In the exemplary embodiment, the pedestal 210 preferably has a width of less than 100 microns, and more preferably between 20 to 50 microns. The pedestal 210 preferably has a height of less than 200, and more preferably has twice the magnitude as the width. The spacing between adjacent pedestals 210 preferably is less than 100 microns, and more preferably has the same magnitude as the width. Pedestals 210 having a reflective material 406 on the sides 408 of the pedestals 210, formed on a viewable surface 202 of a device, and having these dimensions will inhibit the ability to notice smudges that have formed thereon.

Figure 6:
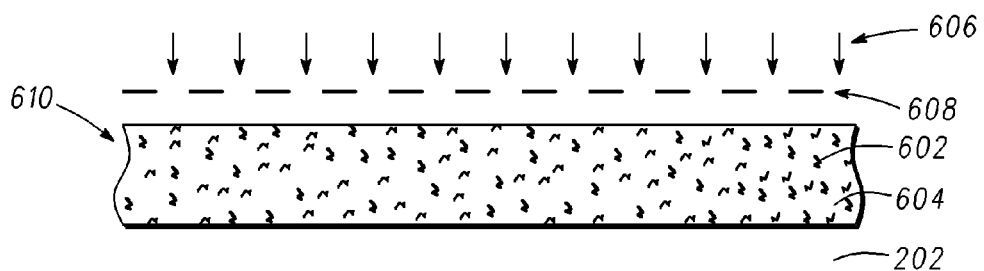
FIG. 6 is a cross section of an intermediate process step for another exemplary embodiment.
Figure 7:
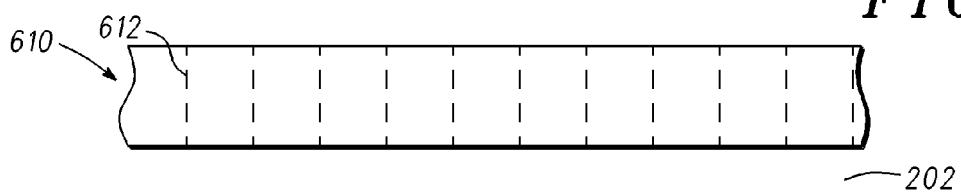
FIG. 7 is a cross section of the exemplary embodiment of FIG. 6.

In another embodiment, a transparent viewable surface is formed incorporating a population of reflectors oriented predominantly orthogonal to the surface. Referring to FIG. 6, the reflectors 602 are uniformly dispersed within the material 604. For example, a resin mixture containing reflective flakes 602 is cast as a sheet 610. The flakes 602 are functionalized with a photopolymer. An AC electric field (not shown) is applied to the sheet 610 to orient the reflectors 602 perpendicular to the surfaces of the sheet 610. Exposure of the resin to UV light 606 in a defined pattern causes the resin mixture to phase separate and polymerize at the regions where the UV light 606 exposure occurs (FIG. 7). The UV mask 608 would provide for evenly distributed reflective surfaces 612, comprising the reflective flakes 602, throughout the sheet 610. The reflective surfaces 612 are spaced less than 100.0 microns apart, and more preferably are spaced between 20.0 and 50.0 microns apart. The reflective surfaces 612 have a height of less than 200 microns from the material 202 (or background), and more preferably have a height of twice the spacing between reflective surfaces 612.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A device comprising:
   a housing comprising a viewable surface including a plurality of cylindrical transparent pedestals disposed on the viewable surface, each cylindrical transparent pedestal having a reflective side, wherein the reflective sides are perpendicular to the viewable surface; and
   electronic circuitry disposed within the housing to present information through the viewable surface.

2. The device of claim 1 wherein each of the pedestals comprises a width of less than 100.0 microns.

3. The device of claim 1 wherein each of the pedestals comprises a height of less than 200 microns.

4. The device of claim 1 wherein the spacing between adjacent pedestals is less than 100 microns.

5. The device of claim 1 wherein each of the pedestals comprises a width in the range of 20.0 and 50.0 microns, each of the pedestals comprise a height of twice the width, and the spacing between adjacent pedestals is equal to the width.

6. A device comprising:
   a display comprising a transparent layer having a viewable surface;
   electronic circuitry to present information to the display; and
   a plurality of pedestals formed on the viewable surface, each of the pedestals comprising:
   a transparent material formed on the viewable surface and having a first surface opposed to and parallel to the viewable surface and at least a second surface perpendicular to the viewable surface; and
   a reflective material formed on the at least a second surface,
   wherein each of the plurality of transparent pedestals has a cylindrical profile.

7. The device of claim 6 wherein each of the pedestals comprises a width of less than 100.0 microns.

8. The device of claim 6 wherein each of the pedestals comprises a height of less than 200 microns.

9. The device of claim 6 wherein the spacing between adjacent pedestals is less than 100 microns.

10. The device of claim 6 wherein each of the pedestals comprises a width in the range of 20.0 and 50.0 microns, each of the pedestals comprise a height of twice the width, and the spacing between adjacent pedestals is equal to the width.

* * * * *